United States Patent [19]

Kihara et al.

[11] Patent Number: 4,879,669
[45] Date of Patent: Nov. 7, 1989

[54] SENSOR SIGNAL PROCESSOR

[75] Inventors: Hiroyuki Kihara, Kodaira; Kazuya Mitaki, Hoya, both of Japan

[73] Assignee: Citizen Watch Co., Ltd., Tokyo, Japan

[21] Appl. No.: 168,728

[22] Filed: Mar. 16, 1988

[30] Foreign Application Priority Data

Mar. 17, 1987 [JP] Japan .................................. 62-61870
Oct. 23, 1987 [JP] Japan ................................ 62-266311

[51] Int. Cl.⁴ ..................... G06F 15/20; G04B 17/20; G04B 9/00
[52] U.S. Cl. .............................. 364/550; 364/571.01; 368/11; 368/66; 368/202
[58] Field of Search ..................... 368/10, 11, 66, 202; 340/636; 73/1 R, 4 R, 6; 364/571.01, 571.02, 571.04, 571.06, 571.07, 550, 558, 705, 707; 323/370; 363/59, 60

[56] References Cited

U.S. PATENT DOCUMENTS

| | | | |
|---|---|---|---|
| 4,043,110 | 8/1977 | Chihara | 368/66 |
| 4,192,005 | 3/1980 | Kurtz | 364/558 |
| 4,303,984 | 12/1981 | Houvig | 364/558 |
| 4,328,572 | 5/1982 | Kawahara | 368/66 |
| 4,418,392 | 11/1983 | Hata | 364/571.07 |
| 4,451,743 | 5/1984 | Suzuki et al. | 323/370 |
| 4,453,834 | 6/1984 | Suzuki et al. | 368/202 |
| 4,604,737 | 8/1986 | Hoffman | 364/413.31 |
| 4,694,410 | 9/1987 | Murata | 368/10 |
| 4,761,771 | 8/1988 | Moriya et al. | 368/202 |
| 4,783,772 | 11/1988 | Umemoto et al. | 368/11 |

Primary Examiner—Parshotam S. Lall
Assistant Examiner—Kevin J. Teska
Attorney, Agent, or Firm—Townsend and Townsend

[57] ABSTRACT

A sensor signal processing apparatus for measuring a physical quantity through the use of a sensor. A data processor automatically provides an operation equation by applying two known physical quantities, at two points, to the sensor and storing the data at these two points in a pair of memories. The quantities in the memories are then converted in accordance with a sensor characteristics equation and displayed on a display unit. In addition, a battery is used to supply the data processor with power. If that battery's voltage level falls below a certain point an alarm is sounded, indicating that the battery should be replaced.

6 Claims, 5 Drawing Sheets

SENSOR SIGNAL PROCESSOR

BACKGROUND OF THE INVENTION

1. FIELD OF THE INVENTION

The present invention relates to a sensor signal processing apparatus for processing an output signal from a sensor for detecting physical information for the purpose of display or the like.

2. DESCRIPTION OF THE PRIOR ART

A recently commercially available electronic timepiece has, in addition to normal functions such as a time display function, an alarm function, and a chrono function, a so-called sensor function for measuring constantly-changing physical information such as a pressure, e.g., an atmospheric pressure or a water pressure or a temperature by a sensor and displaying the information through a signal processor. However, in the electronic timepiece, a space for housing a circuit element is limited, and a small battery is used as a power source. In addition, a service life as a timepiece must be assured for at least two years. Therefore, the sensor function which also uses the battery as a power source must satisfy the following conditions. First, a power consumption required for measuring and displaying the physical information must be reduced as low as possible so as to prolong a battery life. Second, in order to assure reliability of the displayed physical information, an alarm must be reliably generated when a battery voltage is reduced below a predetermined value for maintaining measurement, thereby indicating necessity for replacement of a battery. Third, an element for adjustment such as a variable resistor is omitted as much as possible, and adjustment is eliminated as much as possible. A conventional technique concerning the above conditions will be described below.

In the above battery-driven electronic timepiece, a sensor is used to detect constantly-changing physical information such as a pressure or temperature, and a physical information signal output from the sensor is processed by a signal processor and then supplied to a rear-stage circuit such as a display. When the display is connected to the signal processor as a rear-stage circuit, the signal processor adjusts correspondence between the physical information detected by the sensor and a display value. A conventional adjustment in an atmospheric pressure display unit will be exemplified below.

FIG. 1 shows a conventional sensor signal processing apparatus used in a battery-driven electronic timepiece.

In FIG. 1, reference numeral 1 denotes an atmospheric pressure sensor for outputting an atmospheric pressure signal $S_1$ proportional to an atmospheric pressure P; 2, a sensor driver for supplying a constant current to the atmospheric pressure sensor 1 to drive it; and 3, an amplifier for amplifying the atmospheric pressure signal $S_1$. The amplifier 3 consists of a sensitivity adjusting resistor 3a and an offset adjusting resistor 3b for adjusting an amplification factor and an offset, respectively. Reference numeral 4 denotes an A/D converter for A/D-converting an amplified pressure signal $S_1'$ output from the amplifier 3 and outputting the signal as converted data $D_c$; 5, a sensor information data processor, constituted by a microcomputer, for converting the converted data $D_c$ into sensor information data $D_j$ and outputting it; and 6, a display unit for displaying an atmospheric pressure value in accordance with the sensor information data $D_j$.

An operation of the sensor signal processing apparatus having the above arrangement will be described below.

When the atmospheric pressure sensor 1 is driven by a constant current supplied from the sensor driver 2, it outputs the atmospheric pressure signal $S_1$ proportional to the atmospheric pressure P applied on it. The pressure signal $S_1$ is amplified by the amplifier 3 to be the signal $S_1'$, and the signal $S_1'$ is converted into the converted data $D_c$ by the A/D converter 4. The sensor information data processor 5 has the following predetermined characteristic equation (1):

$$D_j = a \times D_c + b \quad (1) \qquad [a, b: constants]$$

The sensor information data processor 5 receives the converted data $D_c$ and calculates the sensor information data $D_j$ in accordance with sensor characteristic equation (1). The calculated sensor information data $D_j$ is displayed on the display unit 6.

The sensor information data $D_j$ represents the atmospheric pressure P applied on the sensor 1, and the atmospheric pressure P is displayed on the display unit 6. However, since the sensor characteristic equation (1) of the sensor information data processor 5 is fixed, correspondence cannot often be obtained between the atmospheric pressure P and the sensor information data $D_j$ due to variations in sensitivity and offset of the atmospheric pressure sensor 1. Therefore, the sensitivity adjusting resistor 3a and the offset adjusting resistor 3b of the amplifier 3 must be adjusted in advance.

This adjustment is performed as follows.

First, a given atmospheric pressure $P_1$ is applied on the atmospheric pressure sensor 1, and the sensitivity and offset adjusting resistors 3a and 3b are adjusted so that a value $P_1$ is displayed on the display unit 6. Then, an atmospheric pressure $P_2$ different from the atmospheric pressure $P_1$ is applied on the atmospheric pressure sensor 1, and the sensitivity and offset adjusting resistors 3a and 3b are adjusted so that a value $P_2$ is displayed on the display unit 6. In this case, however, when adjustment is performed at the atmospheric pressure $P_2$, adjustment performed at the atmospheric pressure $P_1$ is deviated. For this reason, adjustment is repeatedly performed at the atmospheric pressures $P_1$ and $P_2$ until both the values $P_1$ and $P_2$ are correctly displayed on the display unit 6.

When both the values $P_1$ and $P_2$ are correctly displayed on the display unit 6, the atmospheric pressure sensor 1 can output the atmospheric pressure signal $S_1$ proportional to the atmospheric pressure because it is a linear sensor. Therefore, a correct pressure can be displayed on the display unit 6 throughout a measurement range.

As described above, in the conventional sensor signal processing apparatus, the sensitivity adjusting resistor 3a and the offset adjusting resistor 3b must be provided in the amplifier 3 and adjusted in the above manner. In order to perform the above adjustment, the atmospheric pressures $P_1$ and $P_2$ must be alternately applied a large number of times, resulting in a time-consuming operation. In addition, the adjustment operation must be manually performed. Furthermore, the sensitivity and offset adjusting resistors 3a and 3b are mechanically adjusted and hence are very unstable. Therefore, even if adjustment is correctly performed in the above manner, the sensitivity and offset may be deviated from the corrected values by vibrations or may change over time.

FIG. 2 shows a circuit for detecting a battery voltage of a power source unit of the conventional sensor signal processing apparatus. Such a battery voltage detector is disclosed in, e.g., U.S. Pat. No. 4,043,110.

In FIG. 2, reference numeral 7a in a voltage detector 7 denotes a P-channel MOS transistor (to be referred to as a P-MOS hereinafter). The source and the bulk of the P-MOS 7a are connected to a battery voltage $V_{dd}$, its gate is connected to a reference potential $V_{ss}$, and its drain is connected to the reference potential $V_{ss}$ through a resistor $R_v$. Reference numeral 7b denotes a P-MOS; and 7c, an N-channel MOS transistor (to be referred to as an N-MOS hereinafter). The source and the bulk of the P-MOS 7b are connected to the battery voltage $V_{dd}$, and those of the N-MOS 7c are connected to the reference potential $V_{ss}$.

The gates of the P-MOS 7b and the N-MOS 7c are connected to a node between the drain of the P-MOS 7a and the resistor $R_v$, and their drains are connected with each other to form an output terminal 0. That is, the P-MOS 7b and the N-MOS 7c constitute an inverter.

The conventional voltage detector 7 having the above arrangement utilizes nonlinearity of the P-MOS 7a, linearity of the resistor $R_v$, and the fact that a logical threshold voltage of the inverter constituted by the P-MOS 7b and the N-MOS 7c is about ½ of the battery voltage $V_{dd}$. In this case, since the characteristics of the P-MOS 7a vary due to manufacturing limitations, a resistance of the resistor $R_v$ is adjusted to detect that the battery voltage $V_{dd}$ is reduced to a desired voltage.

When an IC arrangement is adopted in the voltage detector having the above circuit arrangement, variations are increased. Therefore, adjusting resistors must be provided to perform adjustment, resulting in a time-consuming, costly operation.

In addition, the voltage set by the above adjustment is a constant value which is determined by adding a margin to the lowest voltage at which an IC can operate in consideration of variations in ICs. Therefore, in some ICs, a battery is replaced with a new one although its voltage is sufficient for an operation.

SUMMARY OF THE INVENTION

The present invention provides a sensor signal processing apparatus for processing an output signal from a sensor and for detecting and displaying physical information. A signal is detected through the use of a sensor. A data processor processes the signal by automatically applying at two points an equation to two known physical quantities. The data at these two points is then stored in a pair of memories. A sensor characteristics equation is then applied to the data stored in the memories resulting in data ready to be displayed.

The present invention also includes a battery which is used to power the data processor. If the voltage of the battery is reduced below a certain level, an alarm is sounded, indicating that the battery requires a replacement.

It is a first object of the present invention to provide a sensor signal processing apparatus in which correspondence between an output signal from a sensor for detecting physical information and sensor information data can be easily adjusted.

It is a second object of the present invention to provide a sensor signal processing apparatus not requiring an external resistor for adjusting a constant voltage output from a power source unit and its adjustment.

It is a third object of the present invention to provide a sensor signal processing apparatus in which a sensor driver and an A/D converter are operated at different timings and a sample-and-hold circuit for holding a sensor signal is operated during an operation period of the sensor driver.

DETAILED DESCRIPTION OF THE PREFERRED EMBODIMENT

Figure 1:
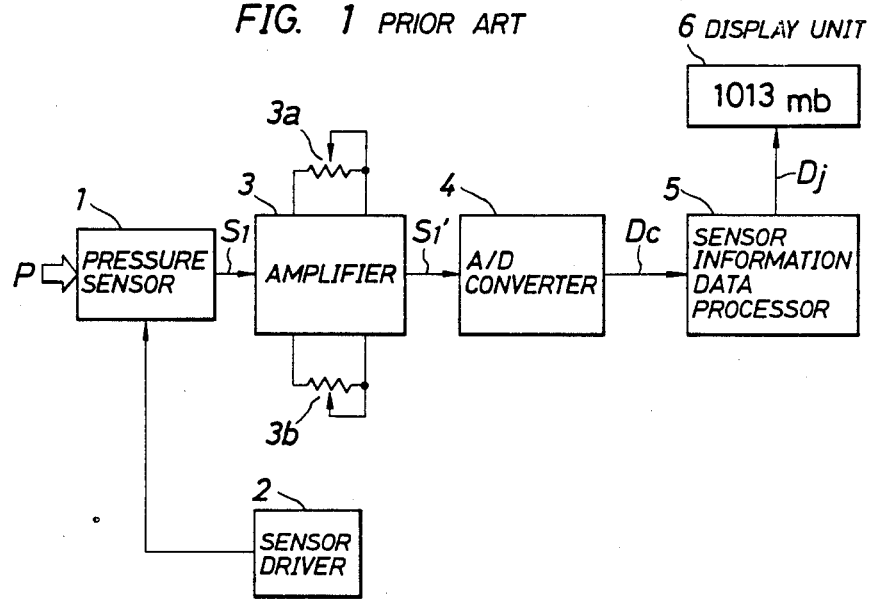
FIG. 1 is a block diagram of a conventional sensor signal processing apparatus.
Figure 2:
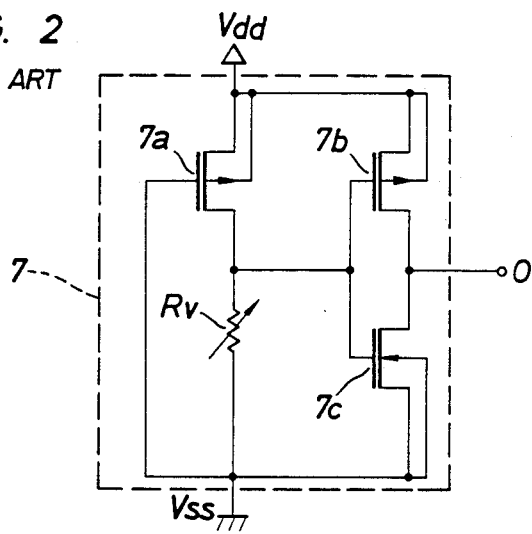
FIG. 2 is a circuit diagram of a power source unit used in the conventional sensor signal processing apparatus.
Figure 3:
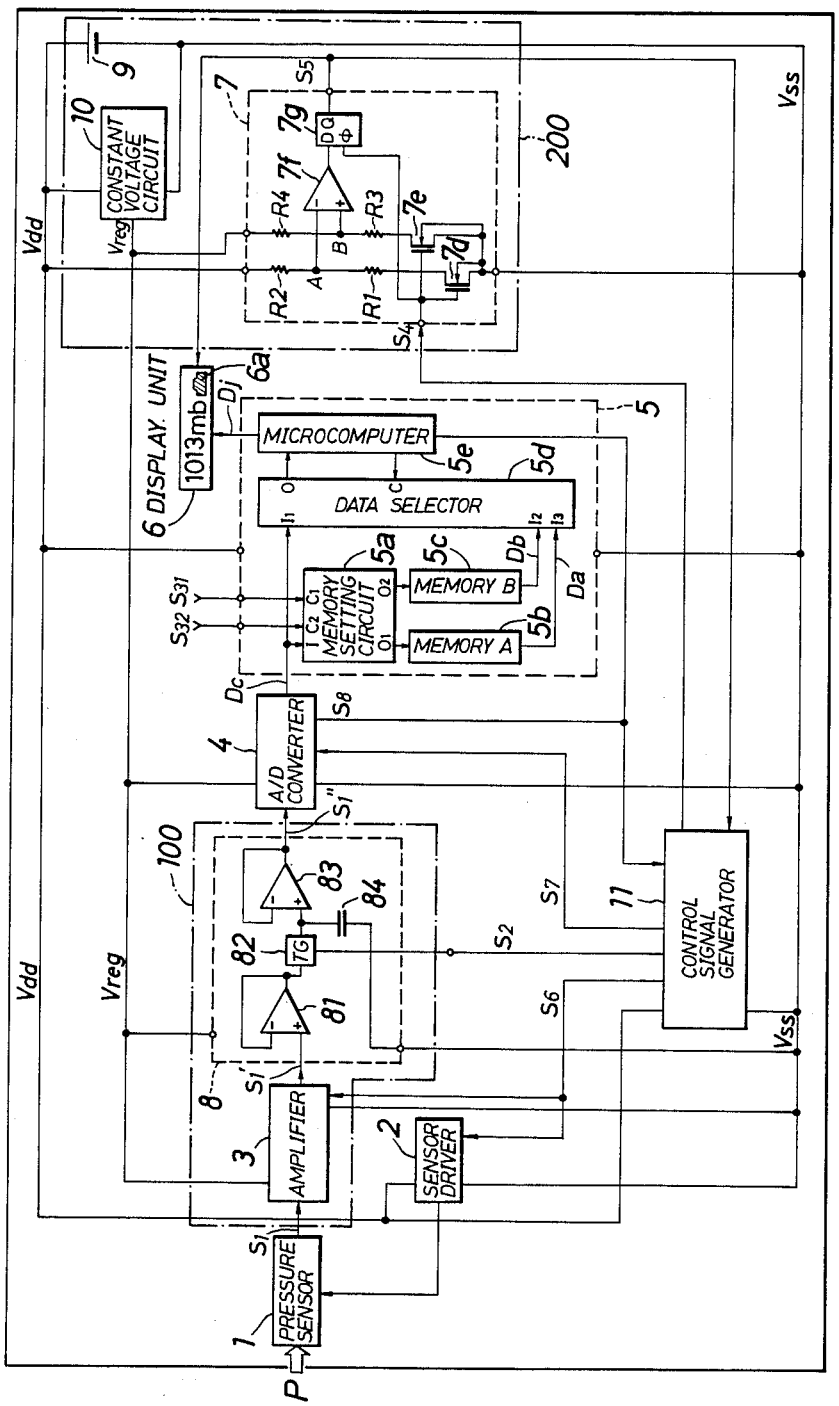
FIG. 3 is a circuit diagram of an embodiment of a sensor signal processing apparatus according to the present invention.

FIG. 3 shows an embodiment of a sensor signal processing apparatus according to the present invention which is designed to display an atmospheric pressure. The present invention will be described below with reference to FIG. 3. In FIG. 3, the same parts as in FIG. 1 are denoted by the same reference numerals.

In FIG. 3, reference numeral 1 denotes an atmospheric pressure sensor for outputting an atmospheric pressure signal $S_1$ proportional to an atmospheric pressure P; 2, a driver for supplying a constant current to the atmospheric pressure sensor 1 to drive it; 3, an amplifier for amplifying the atmospheric pressure signal $S_1$; and 8, a sample-and-hold circuit for holding the atmospheric pressure signal. The sample-and-hold circuit 8 is constituted by a buffer amplifier 81 for outputting an amplified atmospheric pressure signal $S_1'$, a transmission gate (TG) 82 serving as an analog switch, a buffer amplifier 83, and a capacitor 84 for holding a signal. The amplifier 3 and the sample-and-hold circuit 8 constitute an analog signal processor 100 (represented by an alternate long and dashed line).

Reference numeral 4 denotes an A/D converter for A/D converting a signal $S_1''$ output from the sample-and-hold circuit 8 and outputting the signal as converted data $D_c$; and 5, a sensor information data processor for processing the converted data $D_c$ output from the A/D converter 4, i.e., converting the data into sensor information data $D_j$. The sensor information data processor is constituted by a memory setting circuit 5a, a first memory (A) 5b, a second memory (B) 5c, a data selector 5d, and a microcomputer 5e serving as a sensor characteristic calculating means.

The memory setting circuit 5a receives the converted data $D_c$ from the A/D converter 4 at its terminal I and outputs the data from its terminal $O_1$ or $O_2$ in accordance with a control signal $S_{31}$ or $S_{32}$ externally input to its terminal $C_1$ or $C_2$. The memory (A) 5b or memory (B) 5c stores the data.

When the converted data $D_c$ is output from the terminal $O_1$ of the memory setting circuit 5a, it is stored as memory data $D_a$ in the memory (A) 5b. When the converted data $D_c$ is output from the terminal $O_2$, it is stored as memory data $D_b$ in the memory (B) 5c. Note that the memories (A) 5b and (B) 5c are nonvolatile memories and therefore their contents once stored by the memory setting circuit 5a are kept therein even if a power source is cut off.

In accordance with a control signal from the microcomputer 5e, the data selector 5d selectively outputs, from its terminal O, the converted data $D_c$ input to its terminal $I_1$, the memory data $D_a$ which is a stored content of the memory (A) 5b and input to its terminal $I_2$, or the memory data $D_b$ which is a stored content of the memory (B) 5c and input to its terminal $I_3$, and supplies it to the microcomputer 5e.

Reference numeral 9 denotes a battery whose terminal voltage is $V_{dd}$; 10, a constant voltage circuit for generating a constant voltage $V_{reg}$ upon application of the terminal voltage $V_{dd}$ from the battery 9; and 7, a voltage detector for detecting the terminal voltage $V_{dd}$ of the battery 9. The battery 9, the constant voltage circuit 10, and the voltage detector 7 constitute a power source unit 200 (represented by an alternate long and dashed line).

A circuit arrangement of the voltage detector 7 will be described below. Reference numeral 7d denotes an N-MOS, the source and the bulk of which are connected to a reference potential $V_{ss}$, and the gate of which receives a sampling signal $S_4$. The drain of the N-MOS 7d is connected to the battery voltage $V_{dd}$ through resistors R1 and R2. Reference numeral 7e denotes an N-MOS, the source and the bulk of which are connected to the reference potential $V_{ss}$, and the gate of which receives the sampling signal $S_4$.

The drain of the N-MOS 7e is connected to the constant voltage $V_{reg}$ through resistors R3 and R4. Reference numeral 7f denotes a comparator, an inverting input terminal of which is connected to a node A between the resistors R1 and R2, and a noninverting input terminal of which is connected to a node B between the resistors R3 and R4.

Reference numeral 7g denotes a negative going data type flip-flop (to be referred to as a D-FF hereinafter), a data input terminal D of which receives an output from the comparator 7f, and a clock input terminal $\phi$ of which receives the sampling signal $S_4$. The DD-F 7g outputs a battery voltage determination signal $S_5$ of "0" when the terminal voltage $V_{dd}$ of the battery 9 exceeds a desired detection voltage $V_{sen}$, and outputs the signal $S_5$ of "1" when the voltage $V_{dd}$ is below the voltage $V_{sen}$. The resistors R1, R2, R3, and R4 have the following relationship:

$$nR1=R3 \qquad (2)$$

$$V_{sen}/V_{reg}=n(R1+R2)/(R3+R4) \qquad (3)$$

The desired detection voltage $V_{sen}$ is set as the lowest voltage by which the analog signal processor 100, the sensor information data processor 9, and the like can stably operate and is set to be slightly higher than a voltage obtained by adding an operational margin $\Delta V$ to the output $V_{reg}$ from the constant voltage circuit 10.

Reference numeral 11 denotes a control signal generator for receiving the battery voltage determination signal $S_5$ and an A/D conversion end signal $S_8$ and generating a sensor control signal $S_6$, sampling signals $S_2$ and $S_4$, and an A/D conversion command signal $S_7$. An operation of this generator is performed by turning on a start switch SW. The control signal generator 11 will be described in detail later with reference to FIG. 4.

Reference numeral 6 denotes a display unit for digitally displaying an atmospheric pressure value in accordance with the sensor information data $D_j$ output from the microcomputer 5e of the sensor information data processor 5. An alarm indicator 6a is provided at a display portion and turned on when the terminal voltage $V_{dd}$ is reduced below the desired detection voltage $V_{sen}$.

Figure 4:
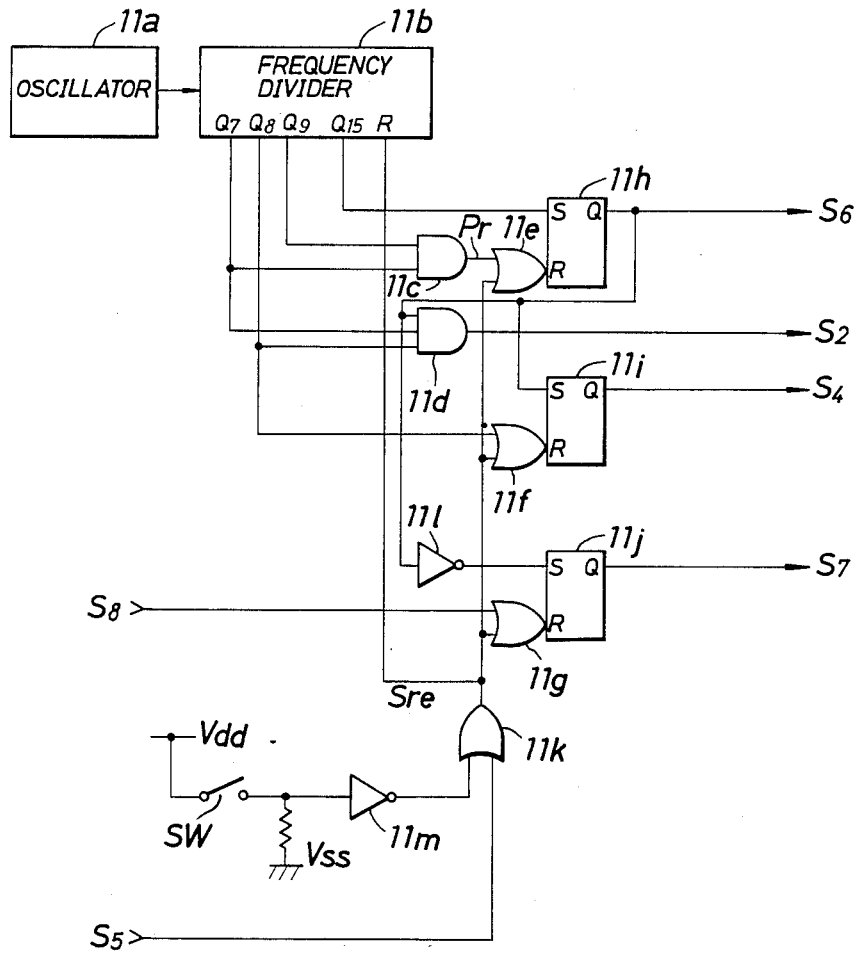
FIG. 4 is a block diagram of a control signal generator of the sensor signal processing apparatus shown in FIG. 3.

A circuit arrangement of the control signal generator 11 will be described below with reference to FIG. 4.

The control signal generator 11 consists of: an oscillator 11a for generating a reference signal (e.g., 32768 Hz); a frequency divider 11b for dividing a frequency of the reference signal at a predetermined dividing ratio; and AND gates 11c and 11d, OR gates 11e, 11f, 11g, and 11k, positive edge set/reset flip-flops (to be referred to as PESR-FFs hereinafter) 11h, 11i, and 11j, and inverters 11l and 11m for logically processing the frequency-divided signals output from output terminals $Q_7$, $Q_8$, $Q_9$, and $Q_{15}$ of the frequency divider 11b and the A/D conversion end signal $S_8$. An output terminal Q of each of the PESR-FFs 11h, 11i, and 11j goes to "H" at a leading edge of a signal input to a set terminal S and goes to "L" at a leading edge of a signal input to a reset terminal R.

The AND gate 11c ANDs outputs from the output terminals $Q_7$ and $Q_9$ of the frequency divider 11b and outputs a signal $P_r$. The AND gate 11d ANDs an output from the terminal Q of the PESR-FF 11h and outputs from the and generates the sampling signal $S_2$.

The OR gate 11k ORs the battery voltage determination signal $S_5$ and an ON/OFF signal from the start switch SW which is inverted by the inverter 11m, and generates a reset signal $S_{re}$. The OR gate 11e ORs the output from the AND gate 11c and the reset signal $S_{re}$, and the OR gate 11f ORs the output from the output terminal $Q_8$ of the frequency divider 11b and the reset signal $S_{re}$. to the output terminal $Q_{15}$ of the frequency divider 11b, its reset terminal R is connected to the output terminal of the OR gate 11e, and its output terminal Q outputs the sensor control signal $S_6$.

The set terminal S of the PESR-FF 11i is connected to the output terminal Q of the PESR-FF 11h, its reset terminal R is connected to the output terminal of the OR gate 11f, and its output terminal Q outputs the sampling signal $S_4$ to the voltage detector 7.

The set terminal S of the PESR-FF 11j is connected to the output terminal Q of the PESR-FF 11h through the inverter 11l, its reset terminal R is connected to the output terminal of the OR gate 11g, and its output terminal Q outputs the A/D conversion command signal $S_7$.

Figure 7:
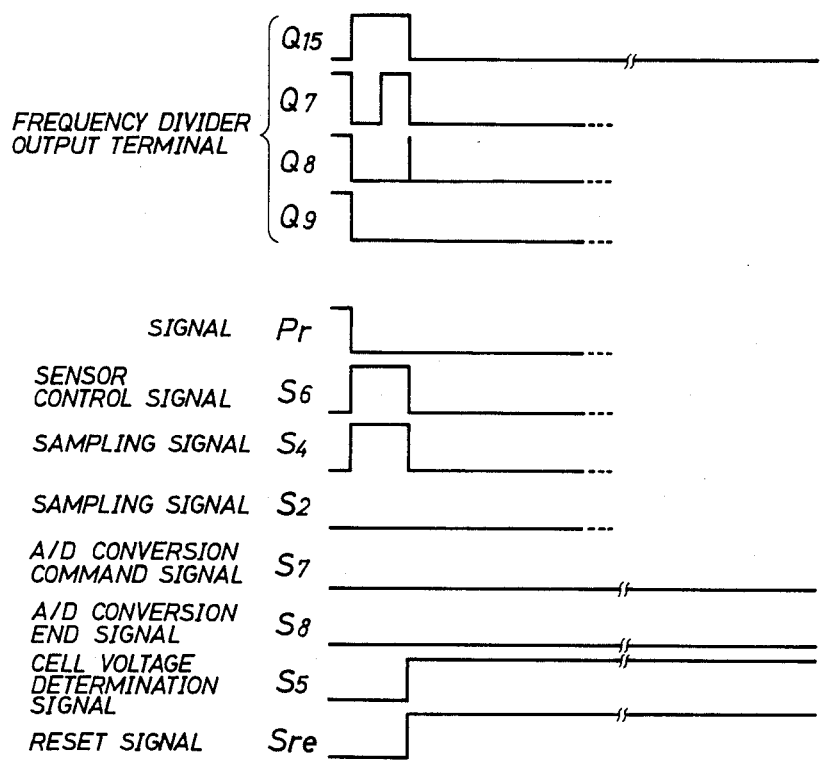
FIG. 7 is a timing chart of the output signals obtained when the control signals and the battery voltage are below the detection voltage.

Referring back to FIG. 3, an operation of the sensor signal processing apparatus according to the present invention will be described with reference to the timing charts in FIGS. 5 and 7.

Prior to description of a sensor signal processing operation, an operation of the control signal generator 11 will be described below.

Figure 5:
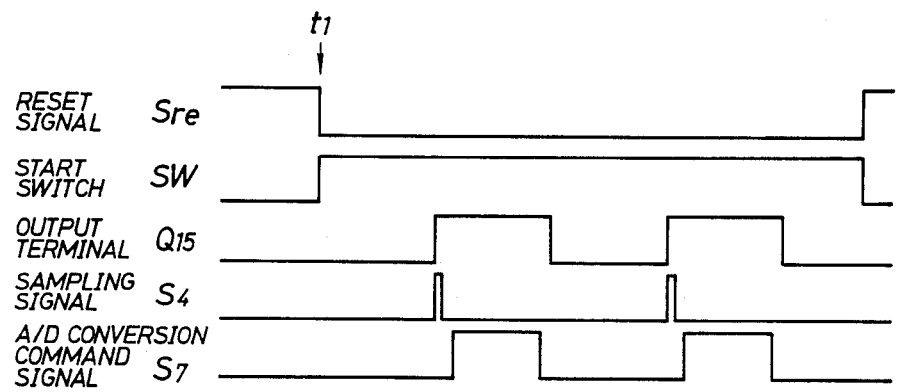
FIG. 5 is a timing chart of control signals.

When the start switch of the control signal generator 11 is in an OFF state, the inverter 11m outputs "H" as shown in FIG. 5. Therefore, the reset signal $S_{re}$ of "H" output from the OR gate 11k is supplied to the frequency divider 11b and the PESR-FFs 11h, 11i, and 11j to reset them. As a result, the sampling signals $S_2$ and $S_4$, the sensor control signal $S_6$, and the A/D conversion command signal $S_7$ go to "L".

Figure 6:
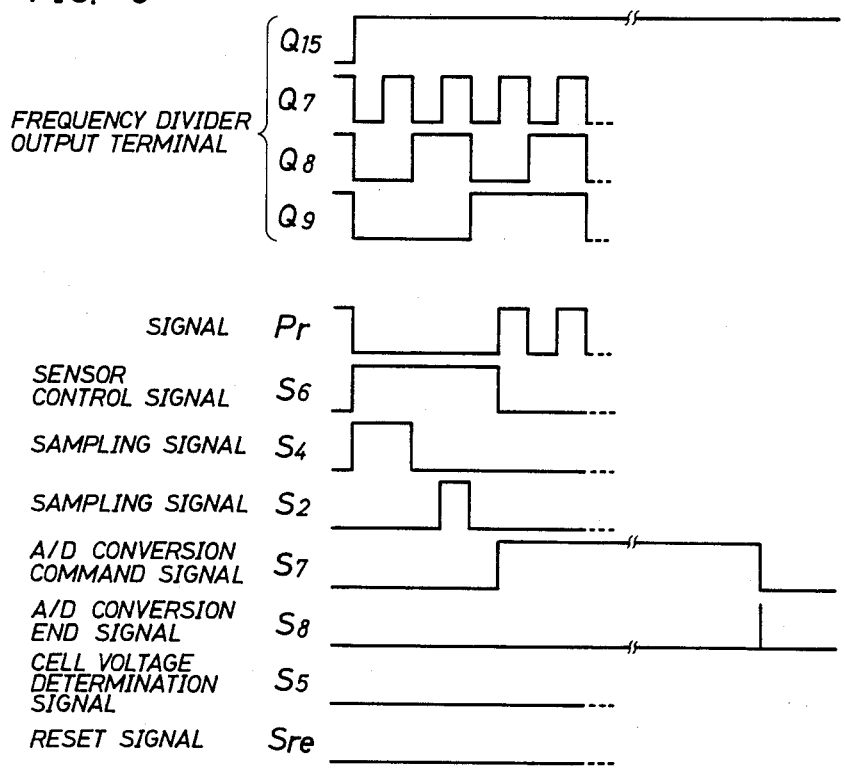
FIG. 6 is a timing chart of output signals obtained when control signals and a battery voltage exceed a detection voltage.

As shown in FIG. 5, when the start switch SW is turned on at a time $t_1$, the reset signal $S_{re}$ output from the OR gate 11k goes to "L". Therefore, the frequency divider 11b is released from the reset state and starts a frequency dividing operation. The frequency divider 11b outputs frequency-divided signals as shown in FIG. 6 from its output terminals $Q_7$, $Q_8$, $Q_9$, and $Q_{15}$. If "H" is output from the output terminal $Q_{15}$ of the frequency divider 11b 0.5 second after the start switch SW is turned on (FIG. 5), the PERS-FF 11h is set and outputs the sensor control signal $S_6$ of "H" from the output terminal Q. This sensor output signal $S_6$ goes to "L" when both the outputs from the output terminals $Q_7$ and $Q_9$ of the frequency divider 11b go to "H".

When the sensor control signal $S_6$ goes to "H", the PRES-FF 11i is set and outputs the sampling signal $S_4$ of "H" as shown in FIG. 5 from the output terminal Q. This sampling signal $S_4$ goes to "L" when the output from the output terminal $Q_8$ of the frequency divider 11b goes to "H".

When the outputs from the output terminals $Q_7$ and $Q_8$ of the frequency divider 11b go to "H" while the sensor control signal $S_6$ is at "H", the sampling signal $S_2$ of "H" is output. A duration of the sampling signal $S_2$ is equal to that of an "H" output from the output terminal $Q_7$ of the frequency divider 11b and is determined in consideration of a time required for a sample-and-hold operation.

When the sensor control signal $S_6$ is switched from "H" to "L", the PRES-FF 11j is set and outputs the A/D conversion command signal $S_7$ of "H" from the output terminal Q. This A/D conversion command signal $S_7$ goes to "L" when A/D conversion is ended and the A/D converter 4 outputs the A/D conversion end signal $S_8$.

An operation of the sensor signal processing apparatus will be described below.

When the start switch SW of the control signal generator 11 is turned on, the sampling signals $S_2$ and $S_4$, the sensor control signal $S_6$, and the A/D conversion command signal $S_7$ are output at the timings described above. As a result, a constant current is flowed from the sensor driver 2 to the atmospheric pressure sensor 1, and the atmospheric pressure sensor 1 outputs the atmospheric pressure signal $S_1$ proportional to an atmospheric pressure applied thereon. The atmospheric pressure signal $S_1$ is amplified by the amplifier 3 on the basis of the constant voltage $V_{reg}$ generated from the constant voltage circuit 10 as an operation reference point, and the amplified signal is supplied to the sample-and-hold circuit 8 as the signal $S_1{'}$.

In the sample-and-hold circuit 8, since the TG 82 is enabled when the sampling signal $S_2$ is supplied, the amplified pressure signal $S_1{'}$ supplied from the buffer amplifier 81 is passed through the TG 82, and the capacitor 84 is charged up to a voltage equal to a voltage level of the signal $S_1{'}$. An enabled time interval of the TG 82, i.e., the duration of the sampling signal $S_2$ is sufficient for performing the sample-and-hold operation. Thereafter, even if the TG 82 is disabled, the capacitor 84 maintains the charged voltage level and outputs the held atmospheric pressure signal $S_1{''}$ through the buffer amplifier 83.

As shown in FIG. 6, the control signal generator 11 outputs the A/D conversion command signal $S_7$ when the sensor control signal $S_6$ is switched from "H" to "L". As a result, the A/D converter 4 converts the atmospheric pressure signal $S_1{''}$ output from the sample-and-hold circuit 8 into the digital converted data $D_c$.

The digital converted data $D_c$ is converted into the sensor information signal $D_j$ by the sensor information data processor 5. Sensor characteristic equation calculation performed by the sensor information data processor 5 will be described below.

First, while a given atmospheric pressure $P_1$ is applied on the atmospheric pressure sensor 1, the control signal $S_{31}$ is externally input to the terminal $C_1$ of the memory setting circuit 5a, and the converted data $D_c$ output from the A/D converter 4 is stored in the memory (A) 5b. Then, while an atmospheric pressure $P_2$ different from the atmospheric pressure $P_1$ is applied on the atmospheric pressure sensor 1, the control signal $S_{32}$ is input to the terminal $C_2$ of the memory setting circuit 5a, and the converted data $D_c$ output from the A/D converter 4 is stored in the memory (B) 5c.

Figure 8:
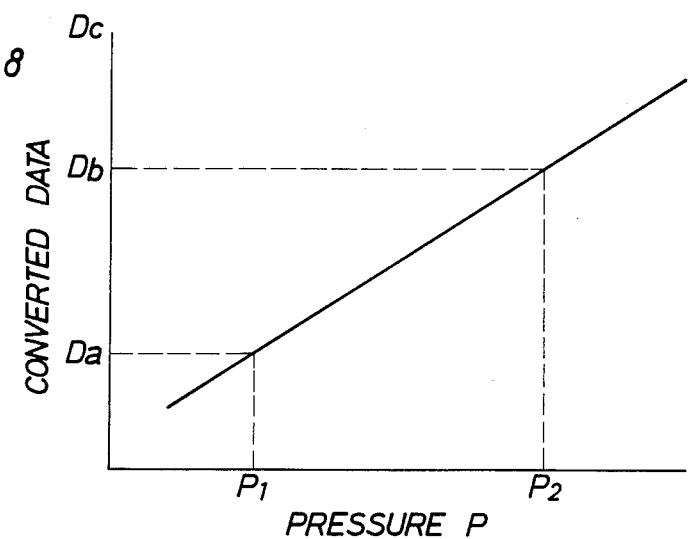
FIG. 8 is a graph for explaining a relationship between physical information and converted data in the sensor information data processor.

That is, as shown in FIG. 8, the converted data $D_c$ obtained at the atmospheric pressure $P_1$ is stored in the memory (A) 5b as the memory data $D_a$, and the converted data $D_c$ obtained at the atmospheric pressure $P_2$ is stored in the memory (B) 5c as the memory data $D_b$. In other words, total atmospheric pressure conversion characteristics of the characteristics of the analog signal processor $100_a$ and those of the atmospheric pressure sensor 1 are stored in the memories (A) 5b and (B) 5c. Sensor characteristic equation calculation performed by the microcomputer 5e will be described below. The microcomputer 5e controls the terminal C of the data selector 5d, reads the memory data $D_a$ (converted data $D_c$ at the atmospheric pressure $P_1$) stored in the memory (A) 5b and the memory data $D_b$ (converted data $D_c$ at the atmospheric pressure $P_2$) stored in the memory (B) 5c, and calculates $\alpha$ and $\beta$, thereby determining the following sensor characteristic equation for determining the sensor information signal $D_j$.

$$D_j = \alpha \times D_c + \beta \quad (4)$$

$$\alpha = (P_2 - P_1)/(D_b - D_a)$$

$$\beta = P_1 - \alpha \times D_a$$

Note that determination of $\alpha$ and $\beta$ of the above sensor characteristic equation need only be performed once when the power source is turned on in accordance with the memory data $D_a$ and $D_b$ stored in the nonvolatile memories. As is apparent from FIG. 6 and sensor characteristic equation (4), the sensor characteristic equation converts the converted data $D_c$ generated by the atmospheric pressure P applied on the atmospheric pressure sensor 1 into the sensor information signal $D_j$ as display information.

After sensor characteristic equation (4) is determined, the converted data $D_c$ is read by the microcomputer 5e through the data selector 5d and the sensor information signal $D_j$ (representing the atmospheric pressure P) is calculated in accordance with sensor characteristic equation (4).

When the digital converted data $D_c$ is input from the A/D converter 4 to the senor information data processor 5 having the sensor characteristic equation determined as described above, the sensor information signal $D_j$ calculated in accordance with the sensor characteristic equation is output from the microcomputer 5e. The display unit 6 displays an atmospheric pressure value (e.g., 1013mb) on the basis of the sensor information signal $D_j$.

An operation of the voltage detector 7 of the power source unit 200 will be described below.

Since no sampling signal $S_4$ is output when the start switch SW of the control signal generator 11 is turned on, both the N-MOS 7d and N-MOS 7e are kept off. Therefore, a voltage at the node A is the battery voltage $V_{dd}$, and a voltage at the node B is the constant voltage $V_{reg}$. For this reason, a voltage at the noninverting input terminal of the comparator 7f is the battery voltage $V_{dd}$, and a voltage at the noninverting terminal is the constant voltage $V_{reg}$. In this case, since a voltage value of the constant voltage $V_{reg}$ is lower than the battery voltage $V_{dd}$, the output from the comparator 7f goes to "L". However, since no sampling signal $S_4$ is input to the terminal of the D-FF 7g, the output from the D-FF 7g does not change.

Thereafter, as shown in FIG. 5, when the sampling signal $S_4$ is output from the control signal generator 11, the N-MOS 7d and the N-MOS 7e are turned on. In this case, since a resistance of the N-MOS 7d obtained when it is turned on is much smaller than R1, a resistance between the node A and the reference potential $V_{ss}$ can be considered to be the same as that of the resistor R1. Similarly, since a resistance of the N-MOS 7e obtained when it is turned on is much smaller than that of R3, a resistance between the node B and the reference potential $V_{ss}$ can be considered to be the same as that of the resistor R3.

At this time, a voltage VA at the node A is given as follows:

$$VA = V_{dd} \cdot R1/(R1+R2) \quad (5)$$

Similarly, a voltage $V_B$ at the node B is given as follows:

$$V_B = V_{reg} \cdot R3/(R3+R4) \quad (6)$$

In this case, equation (6) can be rewritten as follows from equations (2) and (3):

$$V_B = V_{sen} \cdot R1/(R1+R2) \quad (7)$$

From equations (5) and (7), when the battery voltage $V_{dd}$ is higher than the detection voltage $V_{sen}$, the voltage $V_A$ at the node A becomes higher than the voltage $V_B$ at the node B. Therefore, the voltage at the inverting input terminal of the comparator 7f becomes higher than that of the noninverting terminal, and hence the output from the comparator 7f goes to "L".

Thereafter, when the sampling signal $S_4$ falls, the D-FF 7g reads "L" which is the output from the comparator 7g. For this reason, the battery voltage determination signal $S_5$ goes to "L". Therefore, the alarm indicator 6a of the display unit 6 is not turned on.

To the contrary, when the battery voltage $V_{dd}$ is lower than the detection voltage $V_{sen}$, the voltage $V_A$ at the node A becomes lower than the voltage $V_B$ at the node B. Therefore, the voltage at the inverting input terminal of the comparator 7f becomes lower than that at the noninverting input terminal, and hence the output from the comparator 7f goes to "H". Therefore, as shown in FIG. 7, when the sampling signal $S_4$ rises, the D-FF 7g reads "H" which is the output from the comparator 7f. For this reason, the battery voltage determination signal $S_5$ goes to "H". At this time, the alarm indicator 6a of the display unit 6 is turned on to inform a user of a reduction in the battery voltage and necessity for replacement of the battery.

From equations (3) and (4), it is understood that the voltages $V_A$ and $V_B$ are determined in accordance with a ratio between the resistors R1 to R4. Therefore, if the resistance ratio varies, the voltages $V_A$ and $V_B$ are changed. However, as is well known in a semiconductor manufacturing technique, although an absolute value of a resistance changes in accordance with process conditions, a ratio between a plurality of resistors formed in a single semiconductor can be relatively correctly adjusted in consideration of a layout.

Therefore, as in the voltage detector 7 of the present invention, when a value of the detection voltage is determined in accordance with a ratio between the resistors formed in a single semiconductor, troublesome adjustment of the resistors need not be performed.

In the above embodiment, the present invention is applied to the atmospheric pressure display unit. However, it is a matter of course that the present invention is not limited to the above embodiment.

As has been described above, according to the present invention, a sensor driving time can be significantly reduced and a time required for A/D conversion can be sufficiently obtained by the sample-and-hold circuit. Therefore, a power consumption can be reduced. In addition, since a nonadjustment circuit not requiring an adjustment element is adopted as the data processor and the voltage detector, problems of a housing space and adjustment conditions can be solved. Therefore, a sensor function can be effectively added to a small electronic mechanism having limitating conditions such as an electronic timepiece.

What is claimed is:

1. A sensor signal processing apparatus comprising:
   a power source unit including,
      a battery,
      a constant voltage circuit powered by said battery for supplying a constant voltage, and
      a voltage detector for detecting a voltage drop in said battery having a comparator for comparing a terminal voltage of said battery with the voltage supplied by said constant voltage circuit;
   a sensor for detecting physical information;
   an analog signal processor for inputting and processing a sensor signal output from said sensor which is driven by said constant voltage circuit;
   an A/D converter for converting the sensor signal, processed by said analog signal processor, into digital information data output and which is driven by said constant voltage circuit;
   a data processor for generating sensor information data from the digital information data output from said A/D converter including,
      first and second memories for storing first and second digital information data output from said A/D converter, respectively,
      sensor characteristic calculating means for calculating a sensor characteristic equation on the basis of the first and second digital information data stored in said first and second memories and converting the digital information data output from said A/D converter into the sensor information data by applying the sensor characteristic equation calculated by said sensor characteristic calculating means to the digital information data, and a control signal generator for generating control signals for controlling operations of said power source unit, said sensor, said analog signal processor, said A/D converter, and said data processor.

2. An apparatus according to claim 1, wherein said data processor includes terminals for inputting a control signal for writing the digital information, data output from said A/D converter in said first and second memories.

3. apparatus according to claim 1, wherein said first and second memories are nonvolatile memories.

4. An apparatus according to claim 1, wherein said voltage detector comprises:
- a first resistor R1, one end of which is connected to a reference potential;
- a second resistor R2 connected between the other end of said first resistor R1 and a terminal of said battery:
- a third resistor R3, one end of which is connected to the reference potential;
- a fourth resistor R4 connected between that other end of said third resistor R3 and an output terminal of said constant voltage circuit; and
- a comparator for differentially inputting a voltage at a junction between said first and second resistors R1 and R2 and a voltage at a junction between said third and fourth resistors R3 and R4, and a relationship between said first, second, third, and fourth resistors R1, R2, R3, and R4 is given as the following equations:

$$nR1 = R3$$

$$V_{sen}/V_{reg} = n(R1+R2)/(R3+R4)$$

$V_{sen}$ is a detection voltage predetermined in accordance with a battery voltage, $V_{reg}$ is an output voltage of said constant voltage circuit, and n is a positive constant.

5. A sensor signal processing apparatus comprising:
a power source unit;
a sensor for detecting physical information;
a sensor driver for driving said sensor;
an analog signal processor for inputting and processing a sensor signal output from said sensor including a sample-and-hold circuit for sampling-and-holding the sensor signal and supplying the signal to an A/D converter;
an A/D converter for converting the sensor signal processed by said analog signal processor into digital information data;
data processor for generating sensor information data from the digital information data output from said A/D converter; and
a control signal generator for generating control signals for controlling operations of said power source unit, said sensor, said sensor driver, said analog signal processor, said A/D converter, and said data processor, said analog signal processor and for generating a control signal for operating said sensor driver and said A/D converter at different timing and for operating said sample-and-hold circuit within a driving period of said sensor driver.

6. An apparatus according to claim 5, wherein said analog signal processor further includes an amplifier, provided before said sample-and-hold circuit, for amplifying the sensor signal, said amplifying operating in synchronism with said sensor driver in response to a control signal from said control signal generator.

* * * * *